United States Patent [19]

Orbach et al.

[11] Patent Number: 5,027,027

[45] Date of Patent: Jun. 25, 1991

[54] ELECTROMECHANICAL TRANSLATION APPARATUS

[75] Inventors: Zvi Orbach, Haifa; Zeev Ganor, Herzliya, both of Israel

[73] Assignee: Quick Technologies Ltd., an Israeli Company of Advanced Technology Center, Haifa, Israel

[21] Appl. No.: 382,853

[22] Filed: Jul. 20, 1989

[30] Foreign Application Priority Data

Aug. 2, 1988 [IL] Israel ........................................ 87312

[51] Int. Cl.⁵ ............................................. H01L 41/08
[52] U.S. Cl. .................................... 310/317; 310/328
[58] Field of Search ................. 310/323, 320, 317, 26; 318/116, 118

[56] References Cited

U.S. PATENT DOCUMENTS

| | | | |
|---|---|---|---|
| 3,902,084 | 7/1975 | May, Jr. ........................... | 310/328 |
| 3,902,085 | 7/1975 | Bizzigotti ........................ | 310/328 |
| 4,422,002 | 12/1983 | Binnig et al. .................... | 310/328 |
| 4,468,583 | 8/1984 | Mori ................................. | 310/328 |

FOREIGN PATENT DOCUMENTS 0752560 7/1980 U.S.S.R. .............................. 310/328

OTHER PUBLICATIONS

Piezo Drive w/Coarse and Fine Adjustment, by Binnig et al., IBM Technical Disclosure Bulletin, vol. 22, No. 7, Dec. 1979, pp. 2897-2898.

Primary Examiner—Mark O. Budd
Attorney, Agent, or Firm—Ladas & Parry

[57] ABSTRACT

A method of moving along a travel axis and in a selected direction a driven member comprising the steps of providing translation apparatus including a driver mounted in a fixed position relative to a base, the driver comprising selectably operable forward, center and rear elements coupled in series and associated with the driven member and being arranged parallel to the travel axis, the forward and rear elements comprising apparatus for clamping the driven member and the center element comprising apparatus for varying the distance between the forward and rear elements; and in a series of distinct steps, operating the forward, center and rear elements so as to cause movement of the driven member relative to the base including, steps of operation, partially overlapping in time, of the forward and center elements and the center and rear elements and steps of operation, non-overlapping in time, of the forward and rear elements.

21 Claims, 6 Drawing Sheets

FIG. 1A
OFF

FIG. 1B
CLAMP FWD.

FIG. 1C
EXTEND CTR

FIG. 1D
UNCLAMP FWD

FIG. 1E
BEGIN CONTRACT
CTR & CLAMP REAR

FIG. 1F
UNCLAMP REAR

FIG. 1G
BEGIN EXTEND CTR
& CLAMP FWD

ELECTROMECHANICAL TRANSLATION APPARATUS

FIELD OF THE INVENTION

The present invention relates generally to electromechanical translation apparatus and particularly to inchworm linear motors which are capable of motion in incremental steps and to methods and apparatus for operating inchworm linear motors.

BACKGROUND OF THE INVENTION

Inchworm linear motors are compact piezoelectromechanical actuators and known for use in apparatus such as linear actuators and positioners.

Disclosed in U.S. Pat. No. 3,902,084, and incorporated by reference herein, is piezoelectric electromechanical translation apparatus, the load activating shaft of which extends through a housing and is programmably movable over long distances with extremely fine resolution, in extremely small incremental steps by a piezoelectric driver which has three driver sections in end-to-end relationship around the shaft and which is referenced to the housing. The driver is operative to clamp the shaft, and when a staircase voltage is applied to an element thereof, translates the shaft in a direction and over an incremental distance related to the polarity and amplitude of the steps of the staircase voltage. Staircase voltage cycles may be repeated to move the shaft incrementally over a long distance.

There is also disclosed, in U.S. Pat. No. 3,902,085, which is also incorporated by reference herein, electromechanical translation apparatus which provides translation with a high degree of uniformity of motion. The device includes a piezoelectric driver having three driver sections arranged in end-to-end relationship around the shaft. This driver is referenced to a housing and provides forces for moving the shaft with respect to the housing. The sections of the driver are interconnected by bridging members which assemble the driver sections in integral relationship and yet allow movement of the driver sections into and out of engagement with the shaft without imparting undersired motion to the shaft.

Operation of the apparatus disclosed in the two above-referenced U.S. Patents comprises a sequence of steps which involve applying voltages to the driver sections which, for purposes of clarity, will be referred to as forward, center and rear sections with respect to the desired direction of movement of a shaft about which the driver is arranged.

In operation, a voltage is applied to the forward section thus causing it to clamp the shaft. Then a variable rate staircase voltage is applied to the center section causing it to expand and, as the driver is mounted fixed in relation to its housing, the forward section is pushed forward by the extent of the expansion of the center section and, therefore, moves the shaft in a forward direction along a corresponding distance.

A voltage is then applied to the rear section causing it to clamp the shaft and the voltage on the forward section is subsequently removed, the grip of the forward section on the shaft, therefore, being loosened. The staircase voltage, its upper limit having been reached prior to the voltage being applied to the rear section, then starts downward towards its lower limit, causing the center section to contract to its original length. After the center section has contracted, a voltage is then applied to the forward section causing it to clamp the shaft, and the sequence of steps outlined above are repeated.

A disadvantage of the apparatus described above is that in the sequence of steps which constitute its operation, there are steps which involve the simultaneous clamping of the shaft by both the forward and rear sections of the driver.

Systems, in which the translation apparatus or inchworm motors are as described above, resist sudden changes in velocity, such as are caused by clamping the shaft with the rear and forward sections. Simultaneous clamping, therefore, by the front and rear sections generates undesirable stresses on the system as a whole and in particular, causes undesirable wear of the driver sections and of the shaft.

Furthermore, the need for a 'wait' stage, in which both sections are clamped, provides for a relatively slow rate of travel of the shaft.

SUMMARY OF THE INVENTION

It is an aim of the present invention to provide a method of operating piezoelectric electromechanical translation apparatus so as to enable a relatively fast rate of progression of a driven member.

It is also an aim of the present invention to provide a method of operating piezoelectric electromechanical translation apparatus in which the wear on driver sections thereof is reduced when compared with the wear on driver sections of prior art apparatus.

There is provided, therefore, in accordance with an embodiment of the invention, a method of moving along a travel axis and in a selected direction a driven member comprising the steps of providing translation apparatus including a driver mounted in a fixed position relative to a base, the driver comprising selectably operable forward, center and rear elements coupled in series and associated with the driven member and being arranged parallel to the travel axis, the forward and rear elements comprising apparatus for clamping the driven member and the center element comprising apparatus for varying the distance between the forward and rear elements; and in a series of distinct steps, operating the forward, center and rear elements so as to cause movement of the driven member relative to the base including, steps of operation, partially overlapping in time, of the forward and center elements and the center and rear elements and steps of operation, non-overlapping in time, of the forward and rear elements.

Additionally, in accordance with an embodiment of the invention, the steps of operating the forward, center and rear elements comprise the sub-steps of activating the forward element so as to cause clamping of the driven member thereby; activating in a first mode the center element so as to increase the distance between the forward and rear elements, thus causing movement of the forward element and the driven member relative to the base and in the selected direction; deactivating the forward element, thus causing release of the driven member therefrom; activating in a second mode the center element so as to reduce the distance between the forward and rear elements and thus cause a rearward movement of the forward element relative to the direction of movement of the driven member, while activating the rear element so as to clamp therewith the driven member; deactivating the rear element once the center element is almost completely deactivated, thus effecting release therefrom of the driven member; and activating in the first mode the center element so as to increase the distance between the forward and rear elements, while activating the forward element so as to cause clamping of the driven member thereby.

Further in accordance with an embodiment of the invention, the translation apparatus comprises electromechanical translation apparatus.

Additionally in accordance with an embodiment of the invention, the forward, center and rear elements are formed of a piezoelectric material and the step of activating each of the forward and rear elements comprises the step of applying a voltage thereacross, and the steps of activating the center element in the first and second modes comprise the steps of applying a voltage across the center element and diminishing it therefrom, respectively.

There is also provided, in accordance with an alternative embodiment of the invention, a method of moving along a travel axis and in a selected direction, a driven member comprising the steps of providing translation apparatus including a driver mounted in a fixed position relative to a base, the driver comprising selectably operable forward, center and rear elements coupled in series and associated with the driven member and being arranged parallel to the travel axis, the forward and rear elements comprising apparatus for clamping the driven member and the center element comprising apparatus for varying the distance between the forward and rear elements; accelerating the driven member by operating the forward, center and rear elements so as to cause travel of the driven member relative to the base in the selected direction along the travel axis; and operating, subsequent to the step of accelerating, in a series of distinct steps, the forward, center and rear elements so as cause faster travel of the driven member relative to the base including steps of operation, partially overlapping in time, of the forward and center elements and the center and rear elements and steps of operation, non-overlapping in time, of the forward and rear elements.

Additionally in accordance with the alternative embodiment of the invention, the step of accelerating comprises the sub-steps of activating the forward element so as to cause thereby clamping of the driven member; activating in a first mode the center element so as to increase the distance between the forward and rear elements, thus causing movement of the forward element and the driven member relative to the base and in the selected direction; activating the rear element so as to cause clamping thereby of the driven member; deactivating the forward element so as to cause release therefrom of the driven member; activating in a second mode the center element so as to reduce the distance between the forward and rear elements and thus cause a rearward movement of the driven member; and activating the forward element so as to cause clamping thereby of the driven member.

Further in accordance with the alternative embodiment of the invention, the steps of operating the forward, center and rear elements, subsequent to the step of accelerating, comprise the sub-steps of activating the forward element so as to cause clamping of the driven member thereby; activating in a first mode the center element so as to increase the distance between the forward and rear elements, thus causing movement of the forward element and the driven member relative to the base and in the selected direction; deactivating the forward element, thus causing release of the driven member therefrom; activating in a second mode the center element so as to gradually reduce the distance between the forward and rear elements and thus cause a rearward movement of the forward element relative to the direction of movement of the driven member, while activating the rear element so as to clamp therewith the driven member; deactivating the rear element once the center element is almost completely deactivated, thus effecting release therefrom of the driven member; and activating in the first mode the center element so as to increase the distance between the forward and rear elements, while activating the forward element so as to cause clamping of the driven member thereby.

Additionally in accordance with the alternative embodiment of the invention, the forward, center and rear elements are formed of a piezoelectric material and the step of activating each of the forward and rear elements comprises the step of applying a voltage thereacross, and the steps of activating the center element in the first and second modes comprise the steps of applying a voltage across the center element and removing it therefrom, respectively.

BRIEF DESCRIPTION OF THE DRAWINGS

The present invention will be more fully understood and appreciated from the following detailed description taken in conjunction with the drawings, in which.

DETAILED DESCRIPTION OF A PREFERRED EMBODIMENT

Referring to FIGS. 1(A)-1(G) there is shown a sequence of operations of an inchworm linear motor, referenced generally 10, of a type such as disclosed in U.S. Pat. No. 3,092,084 and U.S. Pat. No. 3,092,085, the teachings of which are incorporated herein by reference.

Figure 1A:
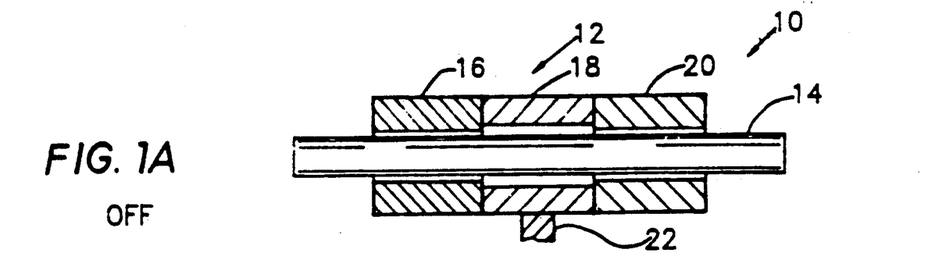
FIGS. 1(A)-1(G) show a sequence of operations of electromechanical translation apparatus according to a preferred method of the present invention.
Figure 1B:
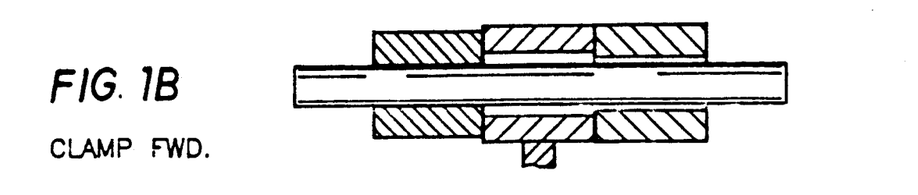

Motor 10 comprises a driver assembly 12 which is arranged about a shaft 14, to a forward end of which (the left end as shown in the drawing) may be attached a load, such as a mirror in an optical system. Driver assembly 12 includes forward, center and rear, typically piezoelectrically activated, cylindrical elements, referenced 16, 18 and 20, respectively, which are coupled together.

Figure 2:
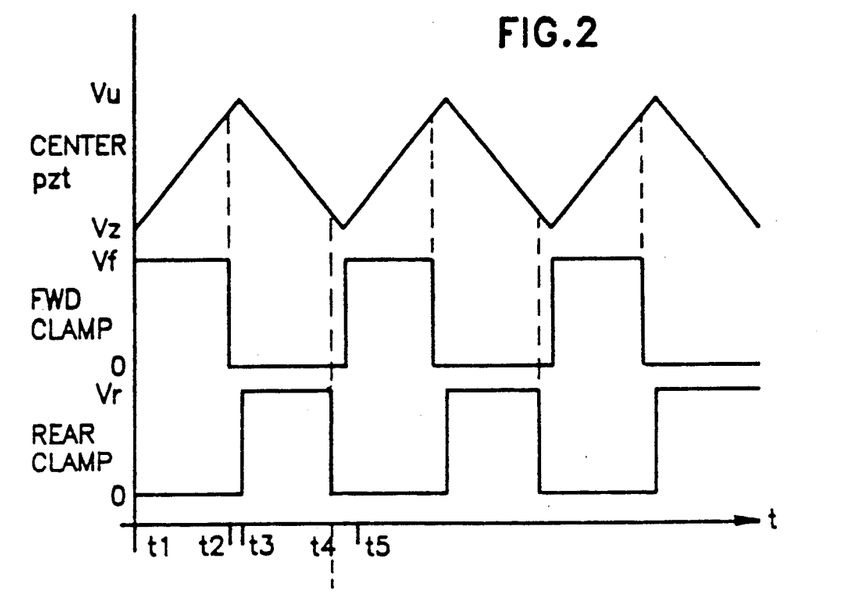
FIG. 2 shows the respective voltage waveforms generated during the operation sequence shown in FIG. 1.

Shaft 14, additionally referenced in FIG. 2, may be moved in a forward direction relative to driver 12 by applying voltages in a predetermined sequence to the driver elements.

In the off position (FIG. 1(A)), no voltage is applied to driver elements 16, 18 and 20 and the elements are, therefore, not engaged with shaft 14. At time $t_1$ (FIG. 2) voltage is applied in the form of a clamping pulse or level to forward element 16 causing expansion of element 16 and clamping thereby (FIG. 1(B)) of shaft 14. Also at time $t_1$, a voltage having a rising staircase waveform is applied to center element 18 thereby causing extension (FIG. 1(C)) of the element.

Figure 1C:
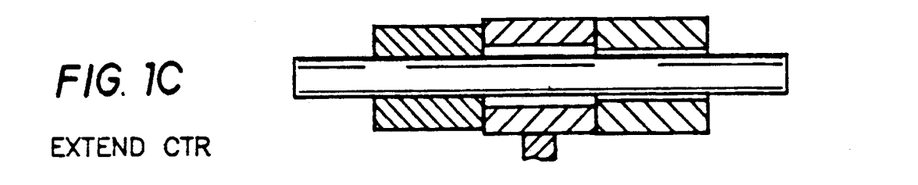

As driver 12 has a fixed location relative to a base (not shown), this being provided by means of an element 22 protruding from center element 18 and cooperating with a corresponding portion of the base, forward element 16 is forced in a forward direction. As element 16 is clamped to shaft 14, shaft 14 is moved axially, also in a forward direction.

Figure 1D:
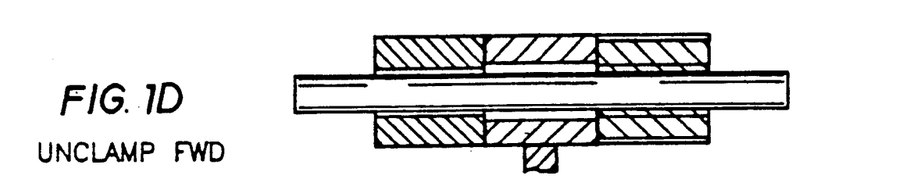
Figure 1E:
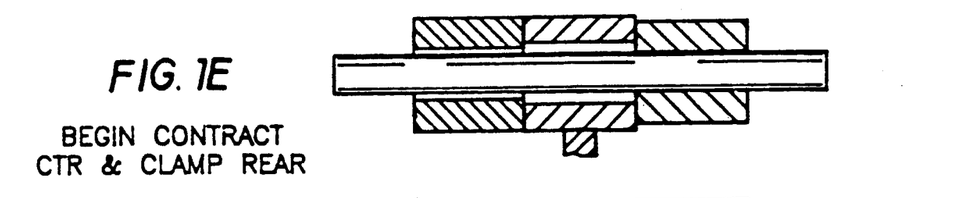

At time $t_2$, prior to the upper limit of the voltage applied to center element 18 being reached, forward element 16 is disengaged (FIG. 1(D)) from shaft 14. At time $t_3$ the upper limit of the voltage applied to center element 18 is reached and the waveform reverses direction, thereby causing contraction (FIG. 1(E)) of center element 18. Simultaneously with the start of contraction of center element 18, a voltage is applied to rear element 20, causing expansion thereof such that the element clamps shaft 14.

Figure 1F:
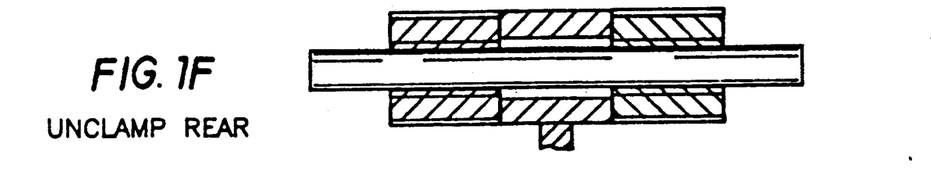
Figure 1G:
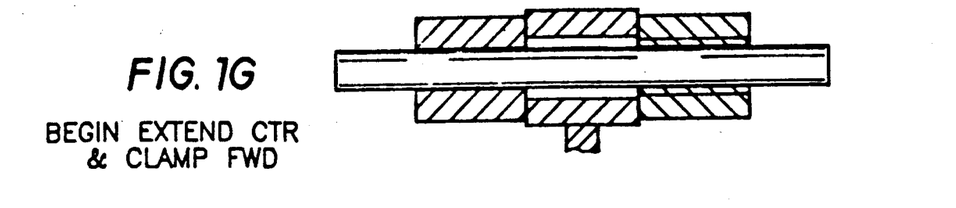

At time $t_4$, prior to complete contraction of center element 18, rear element 20 is disengaged (FIG. 1(F)) from shaft 14. Subsequently, at time $t_5$, a voltage having a rising staircase waveform is again applied to center element 18 so as to initiate extension (FIG. 1(G)) thereof, while simultaneously therewith, a voltage is applied to forward element 16, causing clamping thereof with shaft 14.

It is an important feature of the invention that the operational steps described above overlap slightly so as to avoid the unnecessary generation of stresses within the system, as are generated with prior art methods in which the operational steps include the step of clamping both forward and rear elements so as to bring the shaft to a complete standstill.

It will be appreciated that the lower level of stresses generated using the method of the present invention cause less wear on the forward and rear elements thereby prolonging the number of operations for which they may be used.

Although the technique of the present invention has important advantages for high velocity movements as compared with the prior art, it also involves certain limitations. In the prior art, the shaft is always clamped by at least one clamp. Therefore it can apply significant force, overcome relatively high frictional forces and provide high acceleration.

In accordance with the present invention, there are times when the shaft is unclamped and thus could be pushed back against the desired direction of movement, without any resistance except the inertia of the shaft itself. Such times are indicated as time intervals t 2–t 3 and t 4–t 5 in FIG. 2.

Accordingly, in accordance with an embodiment of the invention, there is provided a technique whereby operation of the motor is switched between the technique of the present invention, which is termed "FLY MODE" and that of the prior art, which is termed "STEP MODE". Upon initial acceleration and otherwise when large forces are required, the prior art STEP MODE driving technique is employed. Once a high velocity is reached, the FLY MODE technique of the present invention is employed.

Figure 3:
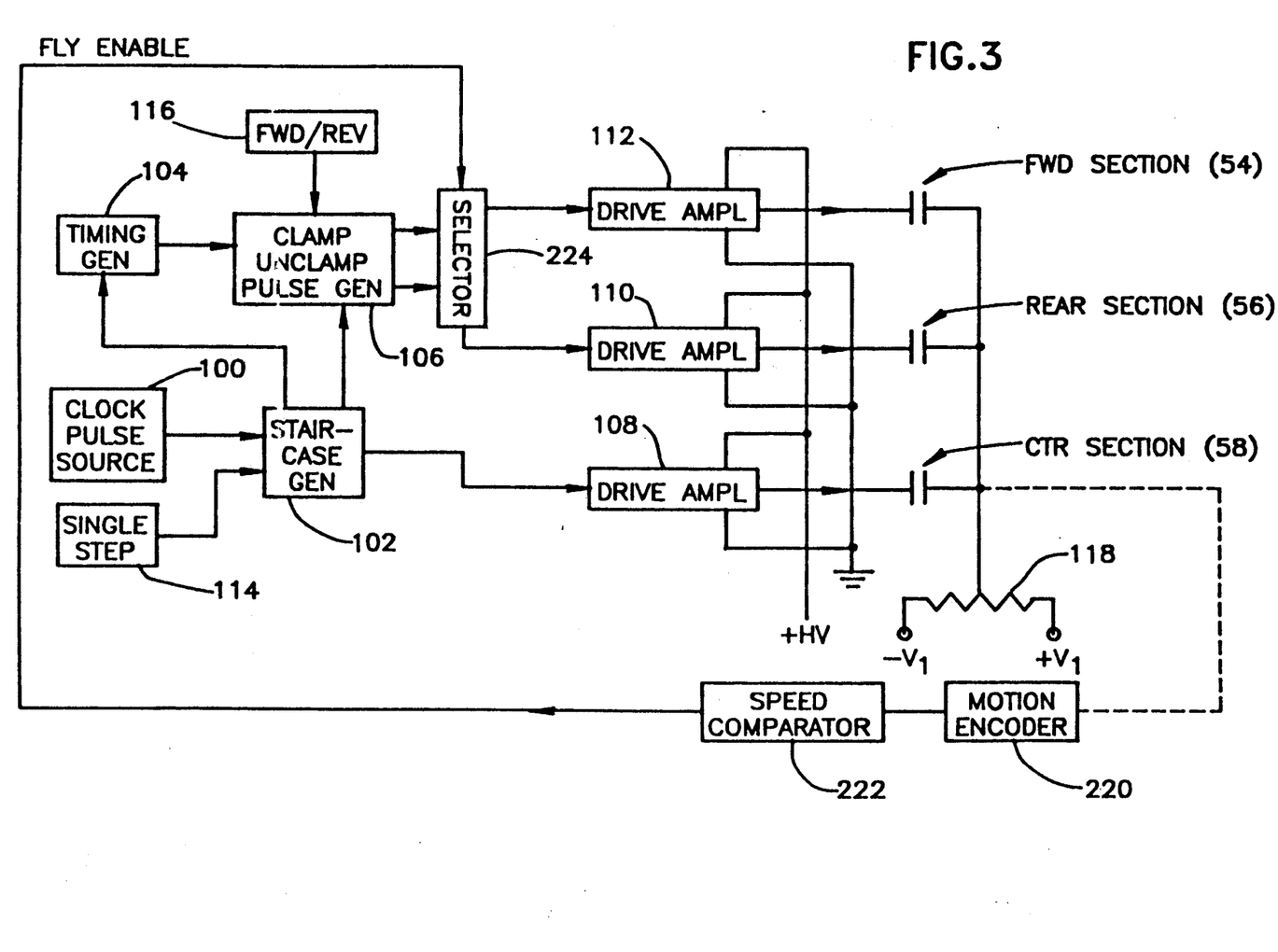
FIG. 3 is a block diagram illustrating the electronic circuit apparatus which may be used together with electromechanical translation apparatus to provide a method of operation thereof as shown in FIG. 1.

Reference is now made to FIG. 3 which is a block diagram illustration of apparatus for driving the linear motor in accordance with the above-described embodiment, i.e. selectably in both modes of operation. FIG. 3 is essentially identical to FIG. 5 of U.S. Pat. No. 3,902,084, the disclosure of which is incorporated herein by reference, with the following changes:

A motion encoder 220, such as a conventional linear encoder, senses the linear motion of the shaft 14 and provides an output to a speed comparator 222, which compares the speed of shaft 14 with a predetermined threshold. Exceedance of such threshold causes comparator 222 to provide a "FLY ENABLE" signal to a selector 224, which receives output signals from clamp-unclamp pulse generator 106 and provides appropriate outputs to drive amplifiers 110 and 112 in accordance with the invention. Upon receipt of the FLY ENABLE signal, the selector selects the FLY signals and accordingly the drive amplifiers 110 and 112 are operated in accordance with the teachings of FIGS. 1(A)–1(G) and 2 hereof. When the FLY ENABLE signal is not provided, the selector 224 selects the STEP signals.

It is appreciated that clamp-unclamp pulse generator 106 must be modified in order to operate in accordance with the present invention.

Figure 4A:
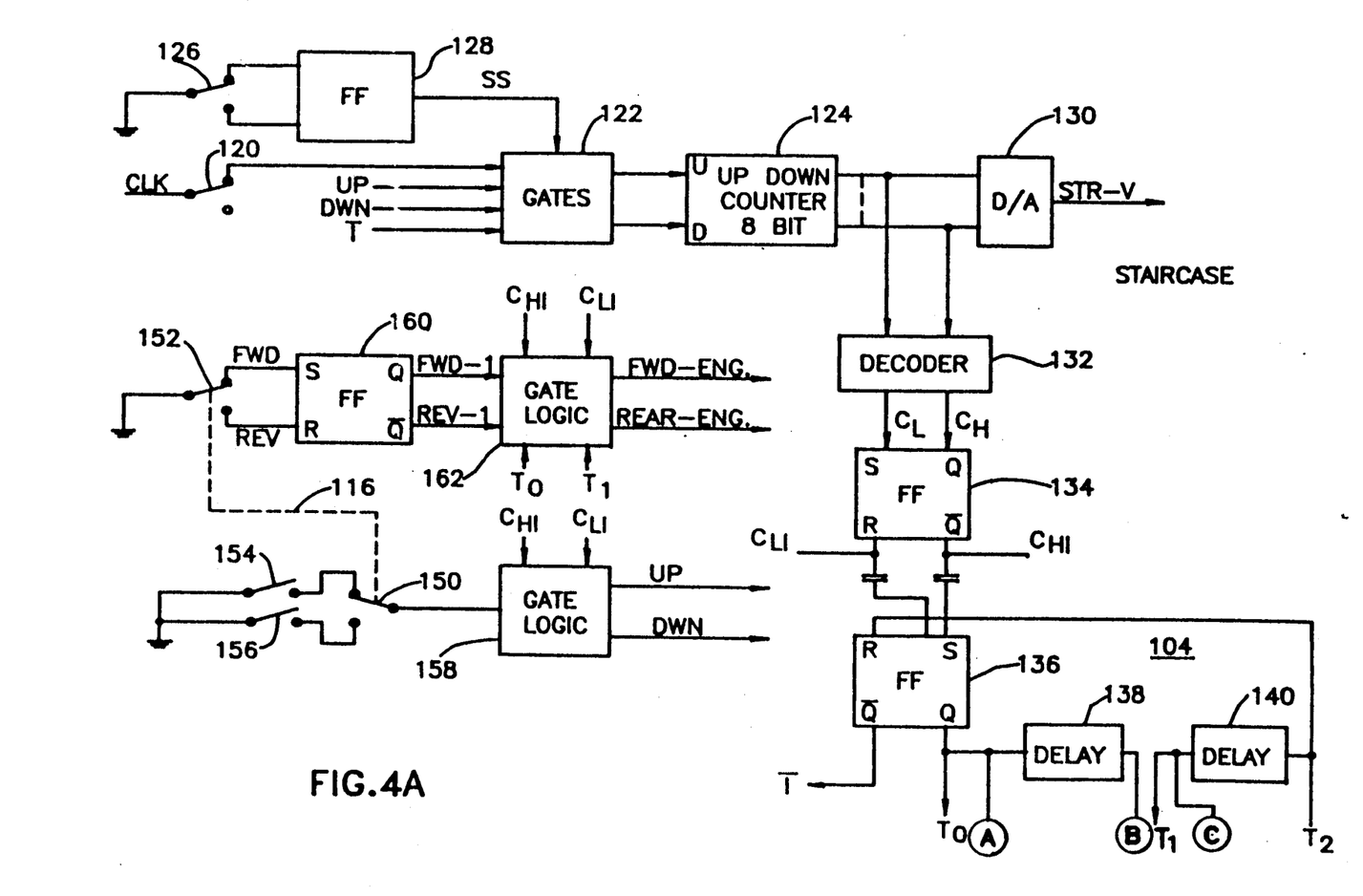
FIGS. 4A and 4B comprise a block diagram illustrating in greater detail a portion of the electronic circuit apparatus shown in FIG. 3.
Figure 4B:
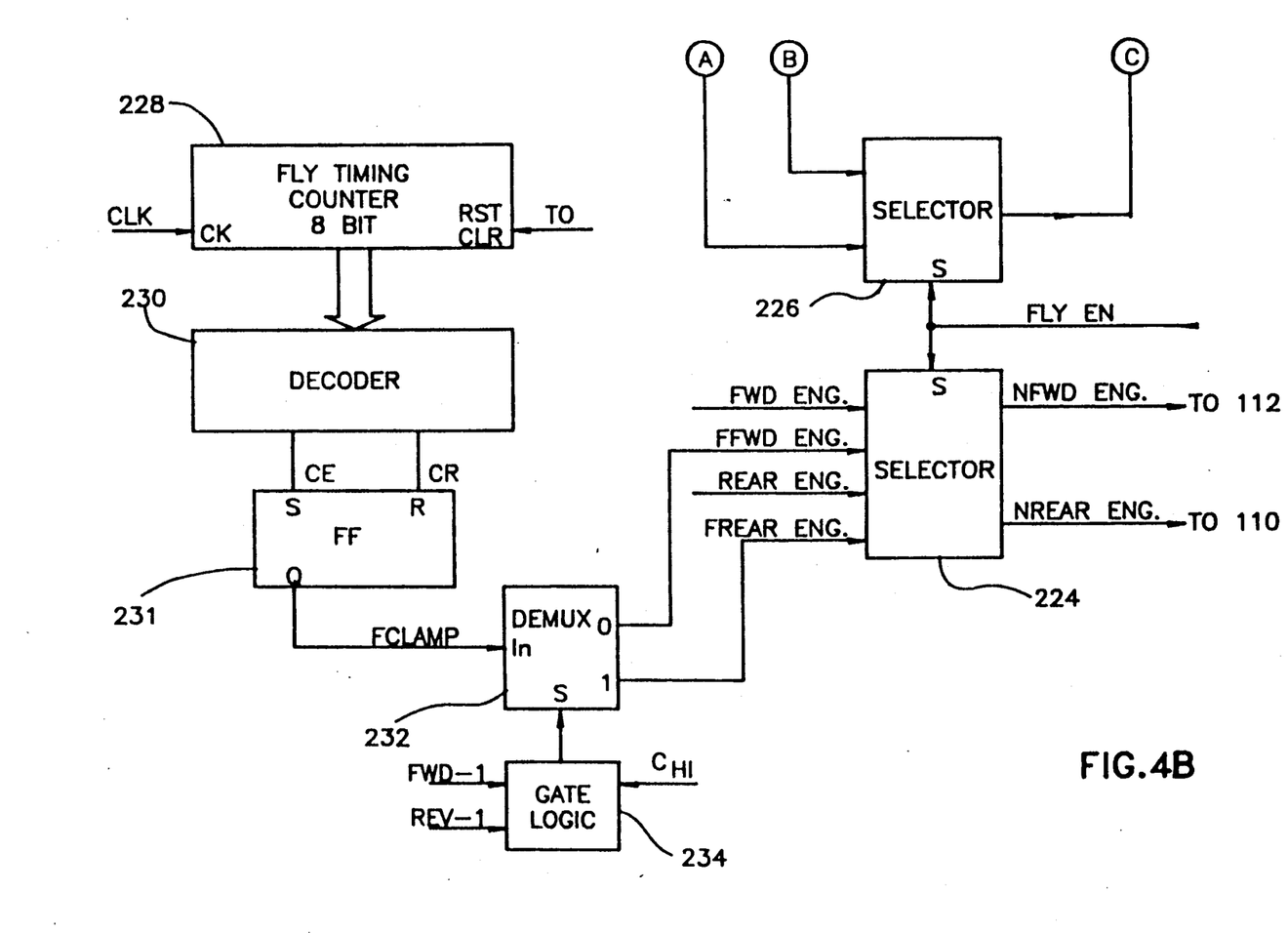
Figure 5:
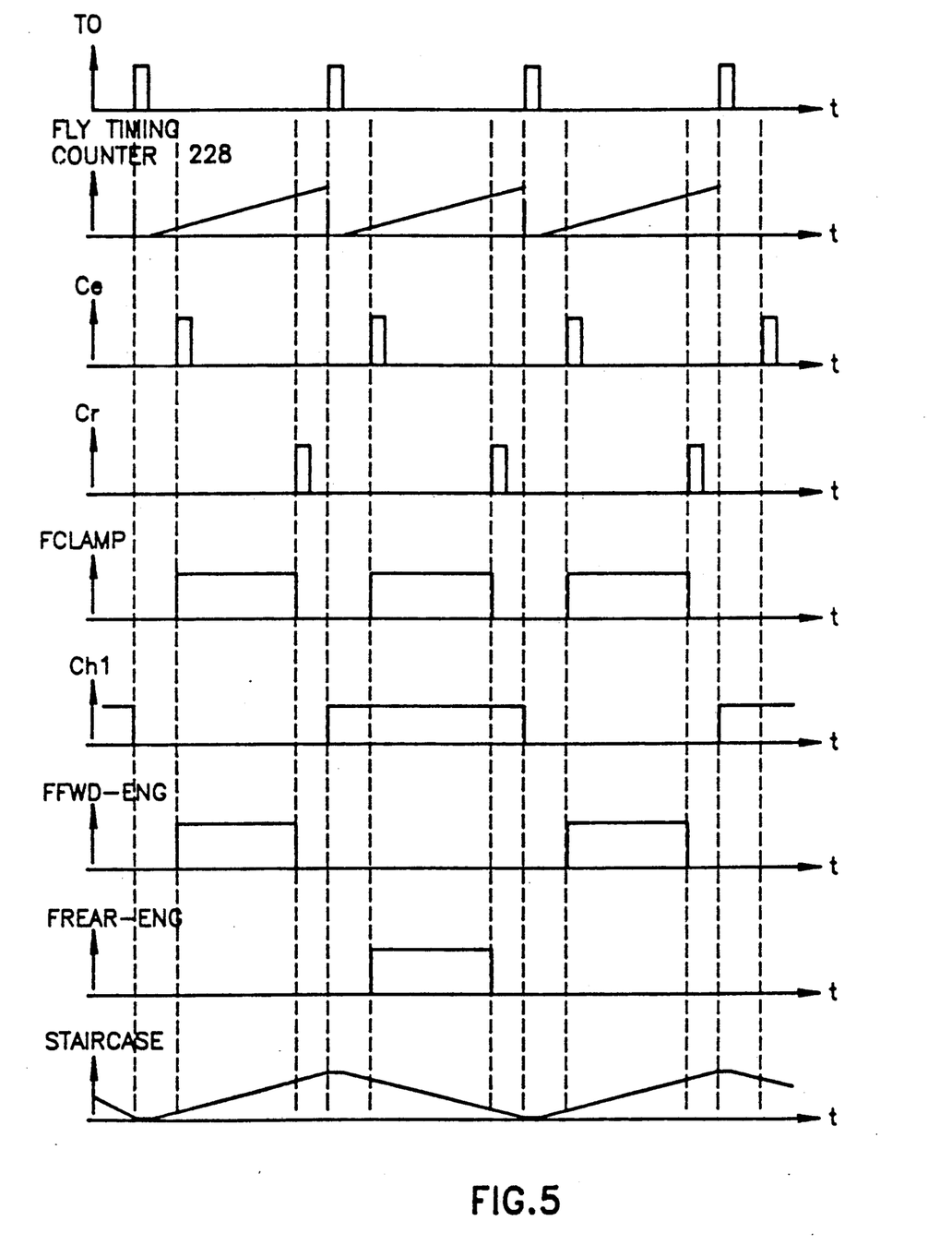
FIG. 5 is a timing diagram illustrating in detail the forward timing signals employed in FLY MODE operation of the electronic circuit apparatus shown in FIG. 4.
Figure 6:
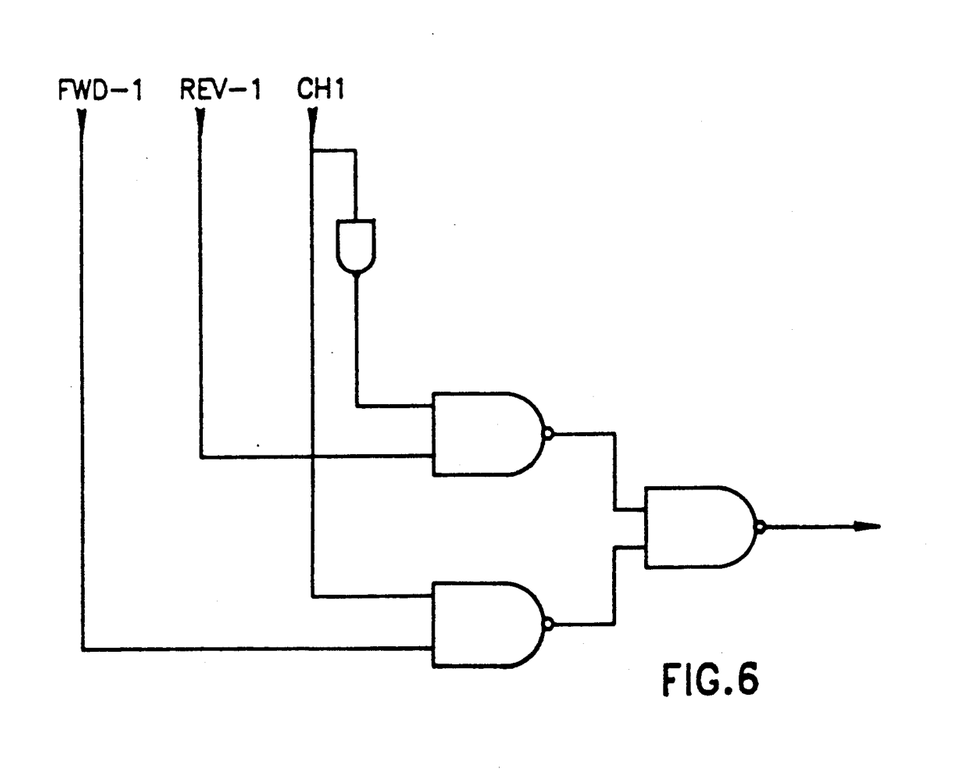
FIG. 6 is a detailed circuit illustration of the gate logic 234 used in conjunction with the electronic circuit apparatus shown in FIG. 4.

Reference is now made to FIGS. 4A, 4B and 5 which illustrate in detail the structure and timing operation of the modified clamp-unclamp pulse generator and the associated selector 224 and other circuitry of FIG. 3. A selector 226 is associated with selector 224 and operates as described hereinbelow. A fly timing counter 228 outputs via a decoder 230 to a flip flop 231, which outputs to a demultiplexer 232, which receives an input from gate logic 234, which is described hereinafter in detail with reference to FIG. 6. The remainder of the circuitry of FIGS. 4A and 4B is identical to that appearing at FIG. 6 of U.S. Pat. No. 3,902,084. Selectors 224 and 226 may be embodied in a TTL 74157 chip. The fly timing counter 228 is an 8 bit up counter and may be embodied in two TTL 74161 components. The decoder 230 may be implemented by a combination of NAND gates. The demultiplexer 232 may be implemented by a TTL 74155 component. The Gate Logic 234 may be implemented by a combination of NAND gates as shown in FIG. 6.

The selector 224 selects the timing signals of the two engine drive amplifiers. The NFWD ENG signal drives the forward engine clamp and the NREAR ENG signal drives the backward engine clamp.

When the FLY ENABLE signal is not active, the selector 224 selects the FWD ENG and the REAR ENG signals and allows the motor to operate in its normal mode (STEP MODE). In that case, the selector 226 selects the output of delay line 138 as T 1 as it is in the original circuit described in U.S. Pat. No. 3,902,084.

When the FLY ENABLE signal is active, the selector 224 selects the FFWD ENG (FLY FWD ENG) and FREAR ENG (FLY REAR ENG) signals and thus enables the motor to operate in the FLY MODE. In FLY MODE operation the timing signals T0, T1 and T2 do not affect the motor clamps. The selector 226 selects T0 as T1, therefore there is only a very short pulse on T0, which is defined by the delay of delay line 140, and is intended only for resetting fly timing counter 228.

The fly timing counter 228 receives a short reset pulse when the CH1 or CL1 signals are active and receives the CLK signal from the input of Gates Circuit 122. The CLK signal is the same clock signal that is provided to Up-Down Counter 124. Counter 228 counts up during rising or falling of the stair-case signal STR-V at the output of O/A 130.

Decoder 230 decodes the outputs of the fly timing counter 228 and provides a CE (Clamp Energized) signal and a CR (Clamp Release) signal. The CE signal is provided at the beginning of the counting (at a count of 10, for example) and the CR signal is provided at the end of the counting (at a count of 230 foir example).

The CE signal sets the flip flop 231 and the CR signal resets it. In that way, there is obtained at the output of flip flop 231 a FCLAMP (Fast Clamp) signal which goes high in response to the CE signal and goes low at the timing of the CR signal. The FCLAMP signal is provided once either at the rise or the fall of the staircase signal STR-V.

The Gate Logic 234 receives the FWD-1 and REV-1 signals from flip flop 160 and the CH1 signal from flip flop 134 and produces a select signal which is supplied to demultiplexer 232. The select signal is changed with every rise and fall of the staircase signal according to the motor direction which is set by the FWD-1 and REV-1 signals.

If the FWD-1 signal is active, the demultiplexer 232 activates the FFWD ENG signal while the staircase signal is rising and activates the FREAR ENG signal while the staircase signal is falling, producing forward motion of the motor. If the REV-1 signal is active, the demultiplexer activates the FFWD ENG signal while the staircase signal is falling and the FREAR ENG signal while the staircase signal is rising, thus producing backwards motion of the motor.

It will be appreciated by persons skilled in the art that the present invention is not limited to what has been shown and described hereinabove. The scope of the invention is, rather, limited solely by the claims which follow:

We claim:

1. A method of moving along a travel axis and in a selected direction a driven member comprising the following steps:
    providing translation apparatus including a driver mounted in a fixed position relative to a base, said driver comprising selectably operable forward, center and rear elements coupled in series and associated with the driven member and being arranged parallel to the travel axis, said forward and rear elements comprising means for clamping the driven member and said center element comprising means for varying the distance between said forward and rear elements; and
    in a series of distinct steps, operating said forward, center and rear elements so as to cause movement of the driven member relative to said base including steps of operation, partially overlapping in time, of said forward and center elements and said center and rear elements and steps of clamping operation, non-overlapping and non-simultaneous in time, of said forward and rear elements.

2. A method according to claim 1, and wherein the steps of operating said forward, center and rear elements comprise the following sub-steps:
    activating said forward element so as to cause clamping of the driven member thereby;
    activating in a first mode said center element so as to increase the distance between said forward and rear elements, thus causing movement of said forward element and the driven member relative to the base and in the selected direction;
    deactivating said forward element, thus causing release of the driven member therefrom;
    activating in a second mode said center element so as to reduce the distance between said forward and rear elements and thus cause a rearward movement of said forward element relative to the direction of movement of the driven member, while activating said rear element so as to clamp therewith the driven member;
    deactivating said rear element once said center element is almost completely deactivated, thus effecting release therefrom of the driven member; and
    activating in said first mode said center element so as to increase the distance between said forward and rear elements, while activating said forward element so as to cause clamping of the driven member thereby.

3. A method according to claim 2, and wherein said translation apparatus comprises electromechanical translation apparatus.

4. A method according to claim 3, and wherein said forward, center and rear elements are formed of a piezoelectric material and said step of activating each of said forward and rear elements comprises the step of applying a voltage thereacross, and said steps of activating said center element in said first and second modes comprise the steps of applying a voltage across said center element and diminishing it therefrom, respectively.

5. A method according to claim 4, and wherein the voltage applied across said center element has a rising staircase waveform.

6. A method according to claim 5, and wherein the travel axis coincides with an axis of symmetry of the driven member.

7. A method according to claim 6, and wherein the driven member is cylindrical and each of said forward, center and rear elements is arranged thereabout.

8. A method of moving along a travel axis and in a selected direction a driven member comprising the following steps:
    providing translation apparatus including a driver mounted in a fixed position relative to a base, said driver comprising selectably operable forward, center and rear elements coupled in series and associated with the driven member and being arranged parallel to the travel axis, said forward and rear elements comprising means for clamping the driven member and said center element comprising means for varying the distance between said forward and rear elements;
    accelerating the driven member by operating said forward, center and rear elements so as to cause travel of the driven member relative to said base in the selected direction along the travel axis; and
    operating, subsequent to the step of accelerating, in a series of distinct steps, said forward, center and rear elements so as cause faster travel of the driven member relative to said base, including steps of operation, partially overlapping in time, of said forward and center elements and said center and rear elements and steps of clamping operation, non-overlapping and non-simultaneous in time, of said forward and rear elements.

9. A method according to claim 8, and wherein the step of accelerating comprises the following sub-steps:
activating said forward element so as to cause thereby clamping of the driven member;
activating in a first mode said center element so as to increase the distance between said forward and rear elements, thus causing movement of said forward element and the driven member relative to said base and in the selected direction;
activating said rear element so as to cause clamping thereby of the driven member;
deactivating said forward element so as to cause release therefrom of the driven member;
activating in a second mode said center element so as to reduce the distance between said forward and rear elements and thus cause a rearward movement of the driven member; and
activating said forward element so as to cause clamping thereby of the driven member.

10. A method according to claim 9, and wherein the steps of operating said forward, center and rear elements, subsequent to the step of accelerating, comprise the following sub-steps:
activating said forward element so as to cause clamping of the driven member thereby;
activating in a first mode said center element so as to increase the distance between said forward and rear elements, thus causing movement of said forward element and the driven member relative to the base and in the selected direction;
deactivating said forward element, thus causing release of the driven member therefrom;
activating in a second mode said center element so as to gradually reduce the distance between said forward and rear elements and thus cause a rearward movement of said forward element relative to the direction of movement of the driven member, while activating said rear element so as to clamp therewith the driven member;
deactivating said rear element once said center element is almost completely deactivated, thus effecting release therefrom of the driven member; and
activating in said first mode said center element so as to increase the distance between said forward and rear elements, while activating said forward element so as to cause clamping of the driven member thereby.

11. A method according to claim 10, and wherein said translation apparatus comprises electromechanical translation apparatus.

12. A method according to claim 11, and wherein said forward, center and rear elements are formed of a piezoelectric material and said step of activating each of said forward and rear elements comprises the step of applying a voltage thereacross, and said steps of activating said center element in said first and second modes comprise the steps of applying a voltage across said center element and diminishing it therefrom, respectively.

13. A method according to claim 12, and wherein the voltage applied across said center element has a rising staircase waveform.

14. A method according to claim 13, and wherein the travel axis coincides with an axis of symmetry of the driven member.

15. A method according to claim 14, and wherein the driven member is cylindrical and each of said forward, center and rear elements is arranged thereabout.

16. Apparatus for moving a driven member along a travel axis and in a selected direction comprising:
translation apparatus including a driver mounted in a fixed position relative to a base, said driver comprising selectably operable forward, center and rear elements coupled in series and associated with the driven member and being arranged parallel to the travel axis, said forward and rear elements comprising means for clamping the driven member and said center element comprising means for varying the distance between said forward and rear elements; and
means for operating said forward, center and rear elements so as to cause movement of the driven member relative to said base including steps of operation, partially overlapping in time, of said forward and center elements and said center and rear elements and steps of clamping operation, non-overlapping and non-simultaneous in time, of said forward and rear elements.

17. Apparatus according to claim 16 and wherein said means for operating said forward, center and rear elements comprise:
means for activating said forward element so as to cause clamping of the driven member thereby;
means for activating in a first mode said center element so as to increase the distance between said forward and rear elements, thus causing movement of said forward element and the driven member relative to the base and in the selected direction;
means for deactivating said forward element, thus causing release of the driven member therefrom;
means for activating in a second mode said center element so as to reduce the distance between said forward and rear elements and thus cause a rearward movement of said forward element relative to the direction of movement of the driven member, while activating said rear element so as to clamp therewith the driven member;
means for deactivating said rear element once said center element is almost completely deactivated, thus effecting release therefrom of the driven member; and
means for activating in said first mode said center element so as to increase the distance between said forward and rear elements, while activating said forward element so as to cause clamping of the driven member thereby.

18. Apparatus according to claim 17, and wherein said translation apparatus comprises electromechanical translation apparatus.

19. Apparatus according to claim 18, and wherein said forward, center and rear elements are formed of a piezoelectric material and said means for activating each of said forward and rear elements comprises means for applying a voltage thereacross, and said means for activating said center element in said first and second modes comprises means for applying a voltage across said center element and diminishing it therefrom, respectively.

20. Apparatus of moving a driven member along a travel axis and in a selected direction comprising:
translation apparatus including a driver mounted in a fixed position relative to a base, said driver comprising selectably operable forward, center and rear elements coupled in series and associated with the driven member and being arranged parallel to the travel axis, said forward and rear elements comprising means for clamping the driven member and said center element comprising means for varying the distance between said forward and rear elements;

means for accelerating the driven member by operating said forward, center and rear elements so as to cause travel of the driven member relative to said base in the selected direction along the travel axis; and means for operating, subsequent to the step of accelerating, in a series of distinct steps, said forward, center and rear elements so as cause faster travel of the driven member relative to said base, including steps of operation, partially overlapping in time, of said forward and center elements and said center and rear elements and steps of operation, non-overlapping in time, of said forward and rear elements.

21. A method according to claim 1 wherein said clamping operation comprises successive clamping periods of time for each of said forward and rear elements, said successive periods of time being separated by a period of time during which neither of said elements is clamping the driven member.

* * * * *